(12) United States Patent
Itoh et al.

(10) Patent No.: US 7,486,292 B2
(45) Date of Patent: Feb. 3, 2009

(54) GRAPH DATA VISUALIZATION AND GRAPHICS PREPARATION

(75) Inventors: Takayuki Itoh, Kawasaki (JP); Keisuke Inoue, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 549 days.

(21) Appl. No.: 10/114,729

(22) Filed: Apr. 2, 2002

(65) Prior Publication Data

US 2002/0196292 A1    Dec. 26, 2002

(30) Foreign Application Priority Data

Apr. 6, 2001    (JP)    ............. 2001-109109

(51) Int. Cl.
*G06T 11/20*    (2006.01)
(52) U.S. Cl. .................................... 345/440
(58) Field of Classification Search .................. 345/440
See application file for complete search history.

(56) References Cited

U.S. PATENT DOCUMENTS

| 5,278,951 A | * | 1/1994 | Camacho et al. | ............ 345/440 |
| 6,774,899 B1 | * | 8/2004 | Ryall et al. | ................. 345/440 |

FOREIGN PATENT DOCUMENTS

| JP | 03-228192 | * | 10/1991 |
| JP | 06-176162 | * | 6/1994 |
| JP | 09-134440 | * | 5/1997 |
| JP | 09-204535 | * | 8/1997 |
| JP | 2000-259841 | * | 9/2000 |
| JP | 2001-034773 | * | 2/2001 |

OTHER PUBLICATIONS

Mao Lin Huang and Peter Eades, A Fully Animated Interactive System for Clustering and Navigating Huge Graphs, 1998, Springer-Verlag Berlin Heidelberg, 10 pages.*
Peter Eades and Mao Lin Huang, Navigating Clustered Graphs using Force-Directed Methods, 2000, Journal of Graph Algorithms and Applications, vol. 4, No. 3, pp. 157-181.*
Mao Lin Huang, Peter Eades, and Junhu Wang, Online Animated Graph Drawing using a Modified Spring Algorithm, 1998, J Australian Computer Science Comm.: Proc. 21st Australasian Computer Science Conf., ACSC, pp. 1-18.*
Andre M.S. Barreto and helio J.C. Barbosa, Graph Layout Using a Genetic Algorithm, Nov. 22-25, 2000, IEEE, Neural Networks, 2000. Proceedings. Sixth Brazilian Symposium on, pp. 179-184.*
Thomas M. J. Fruchterman and Edward M. Reingold, Graph Drawing by Force-directed Placement, Nov. 1991, Software—Practice and Experience, vol. 21(1 1), 1129-1162.*

(Continued)

*Primary Examiner*—Jeffery A. Brier
(74) *Attorney, Agent, or Firm*—Vazken Alexanian

(57) ABSTRACT

The present invention provides methods, apparatus and systems to improve the quality of the arrangement of nodes in a graphics display, for which a graphics image consisting of nodes and arcs is generated, and to increase the processing speed. Nodes are sequentially added and arranged in a display space, and each time a new node is added, a predetermined dynamic model is employed to correct the locations of the new node and of nodes that were previously arranged in the display space. The nodes are arranged beginning with a node having numerous adjacent arcs, so that the nodes that are arranged early in the process are located nearer the center of the display space. In the graphics image thus formed in the display space, arcs located within a predetermined distance of a specific node are curved so they detour around the node.

3 Claims, 21 Drawing Sheets

OTHER PUBLICATIONS

Ed Dengler, Mark Friedell and Joe Marks, in "Constraint-Driven Diagram Layout", Aug. 24-27, 1993, Proceedings of the 1993 IEEE Symposium on Visual Languages, pp. 330-335 is discussed by Ryall at col. 2 lines 1-22.*

* cited by examiner

INPUT GRAPH AND ORDER FOR
DELETION OF NODES

SEPARATION OF A GRAPH INTO
DISCONTINUOUS GRAPH SEGMENTS

MERGING OF FIRST AND SECOND NODES
WITH THE SIXTH AND EIGTH NODES

MERGING OF THE THIRD NODE WITH
THE EIGHTH NODE

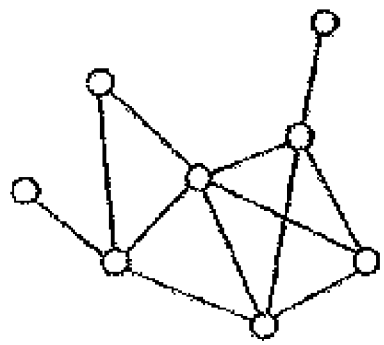
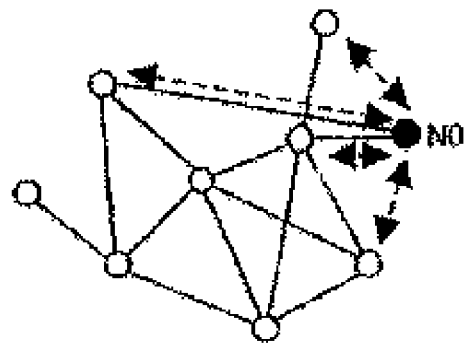
FIG. 11(A)          FIG. 11(B)
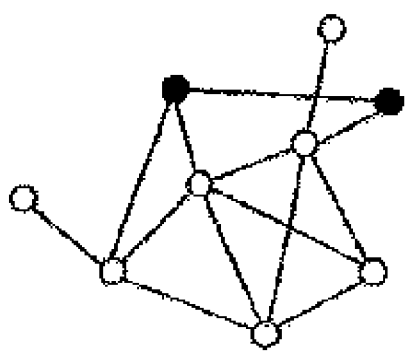
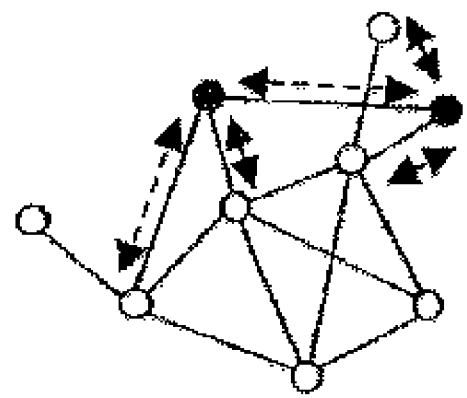
FIG. 11(C)          FIG. 11(D)
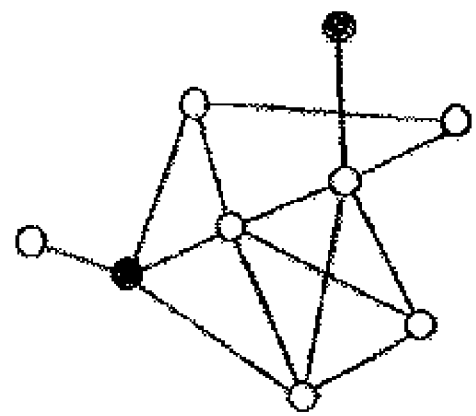
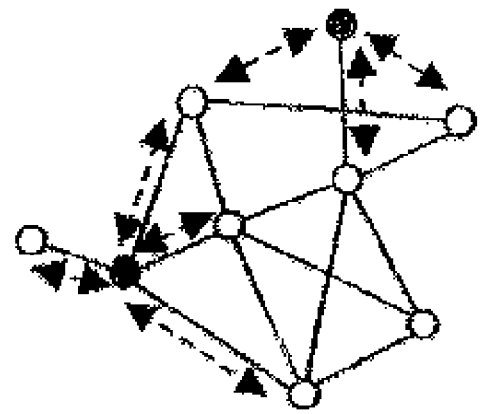
FIG. 11(E)          FIG. 11(F)

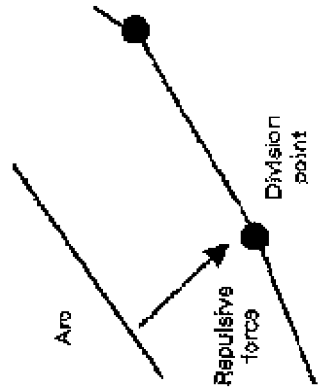

FIG. 14(A)

Intermolecular force model to maintain, at the least, a predetermined distance between a division point and an adjacent node

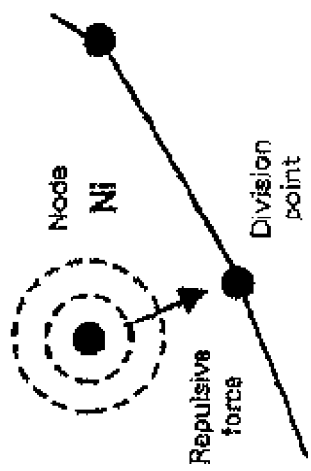

FIG. 14(C)

Spring model to maintain a constant length for each line segment generated by dividing an arc

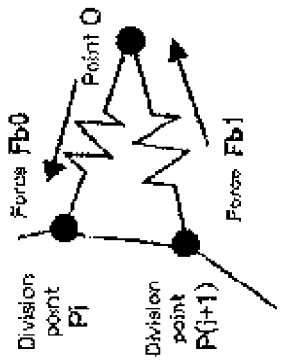

FIG. 14(B)

Spring model to maintain, at the least, a predetermined distance from an adjacent arc parallel to line segment

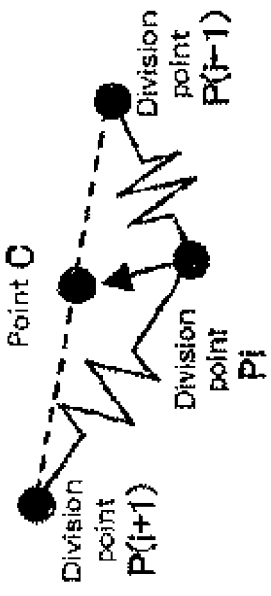

FIG. 14(D)

Spring model to maintain a constant curvature for a line segment obtained by dividing an arc

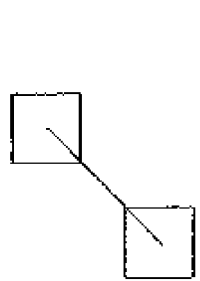
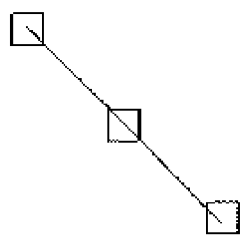
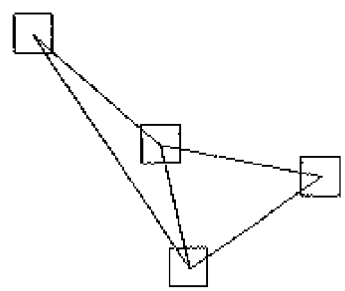
FIG. 15(A)　　　FIG. 15(B)　　　FIG. 15(C)
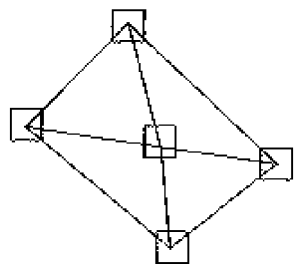
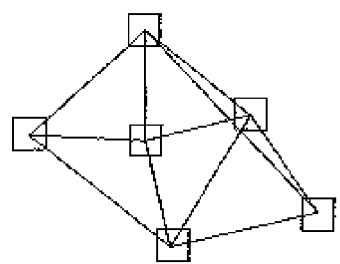
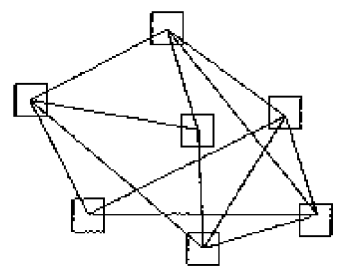
FIG. 15(D)　　　FIG. 15(E)　　　FIG. 15(F)
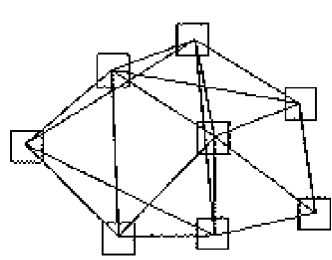
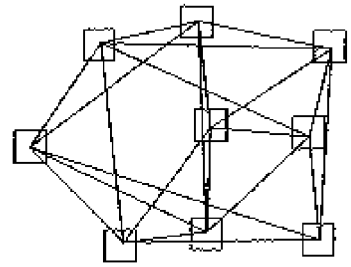
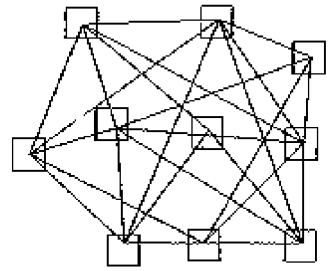
FIG. 15(G)　　　FIG. 15(H)　　　FIG. 15(I)

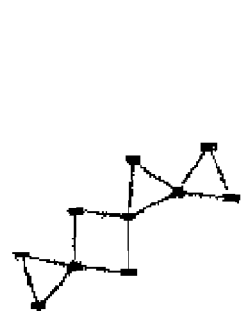
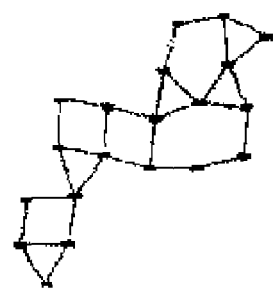
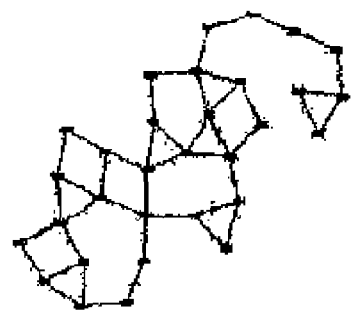
FIG. 16(A)   FIG. 16(B)   FIG. 16(C)
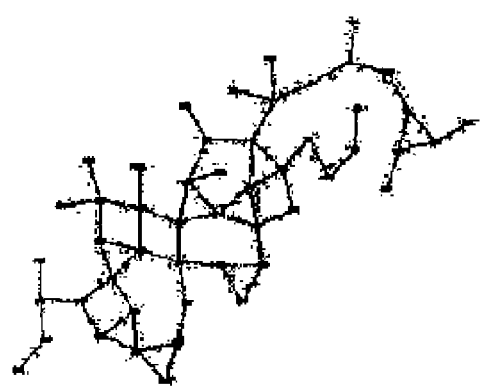
FIG. 16(D)   FIG. 16(E)
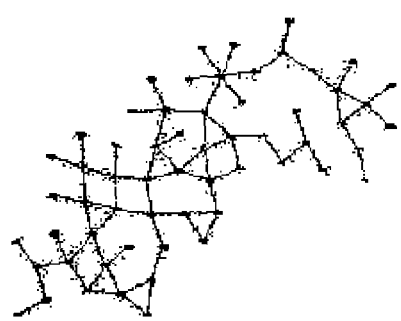
FIG. 16(F)

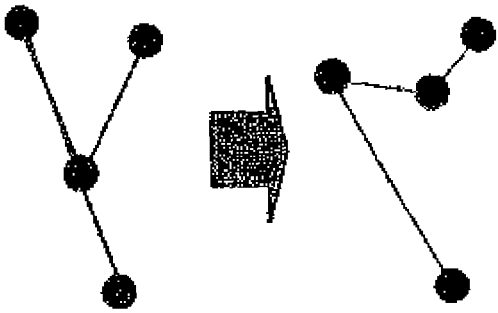
[Condition 3]
Prevent overlapping of another node at a location other than the end point of an arc
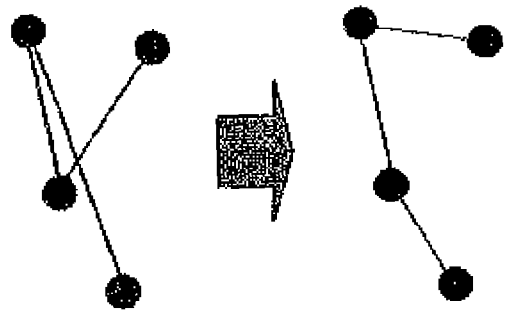
[Condition 2]
Reduce the total length of arcs to the extent possible
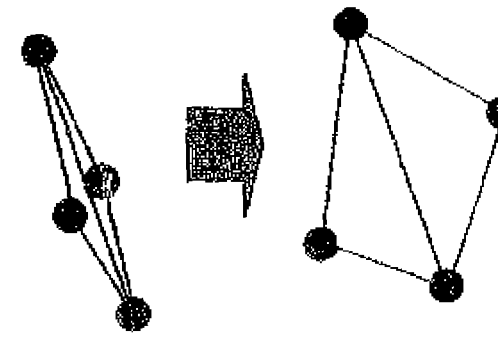
[Condition 1]
Maintain, at the least, a predetermined distance between adjacent nodes
Fig. 21

Fig. 23(A)
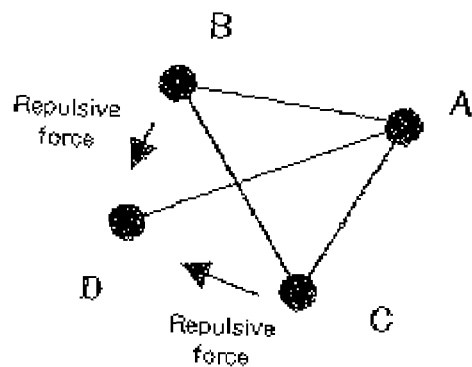
Fig. 23(B)
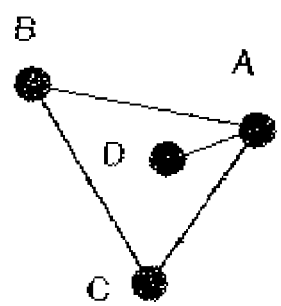
Fig. 23(C)
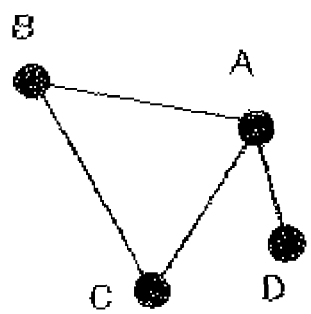
Fig. 23

GRAPH DATA VISUALIZATION AND GRAPHICS PREPARATION

FIELD OF THE INVENTION

The present invention relates to graphics display. It is more particularly related to a graphics display technique for visualizing graph data that is constituted by nodes, and arcs connecting the nodes.

BACKGROUND

Graph data that represent the relationship of the elements of a complete configuration can be visualized by using nodes representing the elements and arcs connecting the nodes. The graphics displays used to visualize graph data can vary, and includes displays for the linked structure of web pages, for networks, such as those for financial, communication, transportation or social organizations, for data graphs for chemical or biological properties, for graphs showing the correlation of text data and image data, and for graphs used to delineate the operation of systems constituted by combinations of several relevant modules (e.g., the processing performed by a parallel processor). As a result, a demand exists for a computer display technique for graphics data that is applicable to a very wide range of fields.

The most important requirement for a graphics display technique is that "nodes and arcs in a graph be automatically so arranged in a display space that the graph is not misunderstood by a reader". In order to resolve the problem this requirement presents, it is preferable that, to the extent possible, the following conditions be satisfied.

[Condition 1] The overlapping of neighboring nodes is prevented by, at the least, maintaining a constant distance between them.

[Condition 2] The total lengths of arcs are reduced by positioning the nodes they connect as closely together as is possible.

[Condition 3] Arcs do not overlap nodes at locations other than at end points.

These conditions are shown in FIG. 21.

A well known, effective conventional method for obtaining a graph arrangement that best satisfies the above conditions provides for the use of an intermolecular force model and a spring model. That is, according to this method, the equation of motion is solved by using the intermolecular force model for the nodes of a graph and the spring model for the arcs of the graph, and then calculating appropriate positions for the nodes. As is shown in FIG. 21, for [Condition 1], according to which erroneous readings are avoided by providing a display in which nodes do not overlap, the intermolecular force model, when used for the nodes, serves as a repulsive force that prevents the overlapping of neighboring nodes.

Further, as is shown in FIG. 21, for [Condition 2], according to which visual apprehension is facilitated by a node arrangement in which nodes connected by arcs are positioned closely together, the spring model, when used for the arcs, serves as an attractive force that reduces the lengths of the arcs.

And finally, as is shown in FIG. 21, for [Condition 3], according to which erroneous readings are avoided by preventing arcs from overlapping nodes at locations other than at end points, in addition to using the intermolecular force model and the spring model, a predetermined distance is designated between arcs and nodes to produce a repulsive force that is exerted from the arcs to the nodes.

FIG. 22 is a diagram showing the state wherein the intermolecular force model is employed for the nodes in the graph and the spring model is employed for the arcs. As is shown in FIG. 22, the intermolecular force model provides a repulsive force that serves as a separating force for the nodes, and the spring model serves as a contracting force (an attractive force between the nodes) that reduces the lengths of the arcs.

The requests made for many applications are for a graphics display technique for the above graph data that will "quickly obtain a minimum required arrangement that can, at the least, prevent erroneous readings, regardless of whether an optimal arrangement is acquired". As a specific example, for a graph of a size (several tens to several hundreds of nodes) that can be satisfactorily arranged in the window of the display device of a personal computer, it is requested that the arrangement results for the graph be obtained within a calculation time of several seconds, and that the "overlapping of nodes" and the "overlapping of a node and an arc" do not occur in the obtained arrangement.

In response to a tradeoff request for "the quality of the obtained arrangement" and "fast processing", by the conventional graph data display method that uses dynamic models, such as the intermolecular force model and the spring model, satisfactory fast processing can not be performed, while the quality of what is displayed is satisfied to a degree. The calculation time required by this conventional method is $O(N^2)$, in the worst case, when the number of nodes is N. $O(N^2)$ means that a calculation can be performed within a period equivalent to constant number of times $N^2$. Therefore, according to the conventional method, the calculation time rises dramatically in consonance with increases in the number of nodes.

The use of a method whereby a predetermined distance is provided between arcs and nodes, by using a repulsive force exerted by the arcs on the nodes, is especially not practical when the intent is the prevention of arc and node overlapping, because in this case there is a remarkable increase in the calculation time.

Further, although the acquisition of satisfactory arrangement results depends greatly on the initial node arrangement, no conventional method exists whereby it can be determined whether an initial arrangement is appropriate.

FIG. 23A is a diagram showing an example inappropriate initial arrangement of nodes. In the examples in FIGS. 23A to 23C, a node A and a node D are connected by an arc, and the attractive force for reducing the length acts on the arc. Therefore, it is preferable that the attractive force exerted by the arc AD be utilized to alter the graph and to provide the one shown in FIG. 23B or 23C. However, since movement of the node A is inhibited by the repulsive force exerted by the nodes B and C, frequently it is not possible to alter the state of the graph shown in FIG. 23A.

As is described above, according to the conventional graphics display method, a node arrangement that does not satisfy Conditions 1 and 2 tends to be output due to an inappropriate initial node arrangement.

SUMMARY OF THE INVENTION

It is therefore an aspect of the present invention to increase the processing speed for a graphics display used for graphic data, and to fully satisfy requests both for the quality of node arrangements and for fast processing.

It is another aspect of the present invention to provide a graphics display technique for graph data that can provide a higher quality node arrangement.

To achieve the above aspects, according to the present invention, an example embodiment of a graph data visualization apparatus comprises: a processor, for employing graph data to generate a graphics image that includes nodes and the arcs that connect the nodes; and a display unit, for displaying the graphics image generated by the processor, wherein the processor sequentially adds and arranges nodes in a display space provided by the display unit, and wherein, each time a node is added, arrangement, the processor corrects the positioning of the individual nodes in the arrangement, by using a predetermined dynamic model for the added node and for nodes that previously were arranged in the display space.

The processor corrects the positions of individual nodes by using the dynamic model for a node that is added to the display space and for nodes that are adjacent to the added node, and for other nodes that are located within a predetermined distance of the added node. That is, the dynamic model is employed only for a local area wherein the added node is located, and for correcting the positions of nodes in that area.

BRIEF DESCRIPTION OF THE DRAWINGS

These and other aspects, features, and advantages of the present invention will become apparent upon further consideration of the following detailed description of the invention when read in conjunction with the drawing figures, in which:

FIGS. 11A to 11F are diagrams for explaining the arrangement of the nodes provided by the node arrangement unit and the displacements of the nodes based on the arrangement;

FIGS. 14A to 14D are diagrams showing the concept of the force exerted at the division points on the arc in FIG. 13;

FIGS. 15A to 15I are diagrams showing graphics display examples wherein the embodiment is actually employed for various graph data in which there are ten nodes to be arranged;

FIGS. 16A to 16F are diagrams showing graphics display examples wherein the embodiment is actually applied for various graph data in which there are seventy nodes to be arranged;

FIG. 21 is a diagram for explaining a condition requested for a graphics display for graph data;

FIG. 23 is a diagram showing an example initial node arrangement that is inappropriate for a graphics display for graph data.

DESCRIPTION OF THE SYMBOLS

Figure 1:
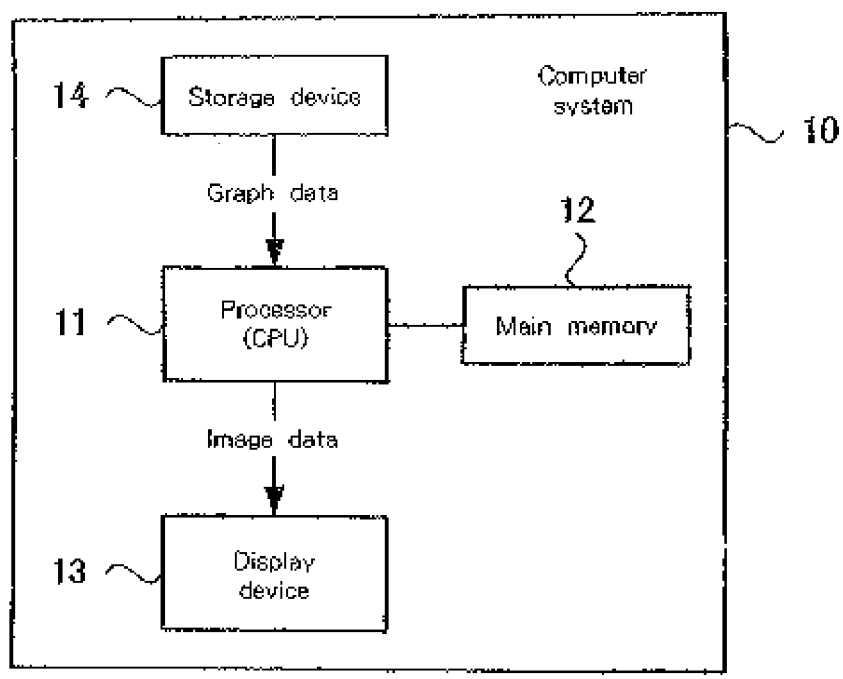
FIG. 1 is a diagram showing an example configuration of a computer system that implements the graph data graphics display technique according to one embodiment of the present invention.

10: Computer system
11: Processor (CPU)
12: Main memory
13: Display device
14: Storage device
21: Node arrangement order determination unit
22: Node arrangement unit
23: Arc curving unit

DESCRIPTION OF THE INVENTION

The present invention provides methods, apparatus and systems for increasing the processing speed for a graphics display used for graphic data, and to fully satisfy requests both for the quality of node arrangements and for fast processing. It also provides a graphics display technique for graph data that can provide a higher quality node arrangement.

In an example embodiment of the present invention, a graph data visualization apparatus incorporating the following feature is provided. A graph data visualization apparatus comprises: a processor, for employing graph data to generate a graphics image that includes nodes and the arcs that connect the nodes; and a display unit, for displaying the graphics image generated by the processor, wherein the processor sequentially adds and arranges nodes in a display space provided by the display unit, and wherein, each time a node is added, arrangement, the processor corrects the positioning of the individual nodes in the arrangement, by using a predetermined dynamic model for the added node and for nodes that previously were arranged in the display space.

The processor corrects the positions of individual nodes by using the dynamic model for a node that is added to the display space and for nodes that are adjacent to the added node, and for other nodes that are located within a predetermined distance of the added node. That is, the dynamic model is employed only for a local area wherein the added node is located, and for correcting the positions of nodes in that area.

In a graph data visualization apparatus including the processor and the display unit described above, the processor adds and arranges nodes in the display space provided by the display unit, beginning with the node having the greatest number of adjacent arcs. The processor rearranges nodes beginning at a location near the center of the display space.

In a graph data visualization apparatus including the processor and the display unit described above, in a graphics image formed in the display space, the processor curves an arc located within a specific distance of a predetermined node in order to move the arc away from the node.

Specifically, the processor divides an arc located within the specific distance of the predetermined node to move the division points of the arc away from the predetermined node, and converts line segments between the division points into curves having a predetermined curvature. The processor maintains a distance between the line segments, and neighboring arcs parallel to the line segments, that is equal to or greater than a predetermined distance. In addition, the processor divides into line segments having a specific length the arc located within the specific distance of the predetermined node.

A graphics preparation method, whereby a computer generates a graphics image to be output in a visual form, comprises the steps of: sequentially adding and arranging nodes in a drawing area to generate the graphics image therein; and each time a node is added, solving an equation of motion based on a predetermined dynamic model used for the added node and a node previously located in a display space, and updating the position of individual nodes.

The step of arranging nodes in the drawing area includes a step of: solving an equation of motion by locally employing the dynamic model for the added node and a node near the added node, and updating the positions of these nodes.

A graphics preparation method, whereby a computer generates a graphics image to be output in a visual form, comprises the steps of: determining the order in which nodes are to be arranged in a drawing area while generating the graphics image therein, so that the arrangement of the node having the greatest number of adjacent arcs is performed first; and arranging nodes in accordance with the determined order, beginning at the center of the drawing area and moving outward, toward the periphery.

Further, a graphics preparation method, whereby a computer generates a graphics image to be output in a visual form, comprises the steps of: arranging nodes in a drawing area to generate the graphics image therein, and extending arcs distributed among the nodes; and after the nodes and the arcs are arranged, altering arcs adjacent to predetermined nodes, other than at nodes at end points, so as to circle around the predetermined nodes. That is, according to this graphics preparation method, a process for arranging the nodes in the drawing area is separated from a process for altering the arcs to shape an image that can be easily seen without the nodes and the arcs being overlapped.

In an example embodiment, the step of arranging nodes and arcs in the drawing area to generate the graphics image therein includes the steps of: determining the order in which nodes are to be arranged in the drawing area; and sequentially arranging the nodes in accordance with the order determined for the arrangement of the nodes, and extending arcs to the nodes.

In some case, the step of altering the shapes of the arcs includes the steps of: dividing an arc located within a specific distance of a predetermined node; moving division points on the arcs away from the predetermined node; and converging line segments between the division points to form curves having a predetermined curvature.

The present invention can also be provided as a program that permits a computer to perform the processes corresponding to the steps of the graphics preparation methods. Furthermore, according to the present invention, a program, for controlling a computer for generating a graphics image including nodes and arcs for connecting the nodes, permits the computer to implement: a function for determining the order in which nodes are to be arranged to generate the graphics image in a drawing area, so that the arrangement of the nodes can begin with the node having the greatest number of adjacent arcs; and a function for arranging nodes in the determined order, beginning at the center of the drawing area and moving outward, toward the periphery.

Further, according to the present invention, a program, for controlling a computer for generating a graphics image, including nodes and arcs connecting the nodes, permits the computer to implement: node arrangement means, for arranging nodes in a drawing area for generating the graphics image therein, and for extending arcs between the nodes; and arc curving means, for, after the nodes and the arcs are arranged in a drawing area, curving arcs located within a specific distance of the predetermined nodes, so as to circle around the predetermined nodes. Moreover, according to the present invention, for distribution these programs can be recorded on a storage medium, such as a magnetic disk, an optical disk or a semiconductor memory, or can be provided by a program transmission apparatus via a network.

An advantageous embodiment of the present invention will now be described in detail while referring to the accompanying drawings. In this embodiment, a computer system performs a graphics display process by which graph data used to describe relationships among constituent elements of a configuration are presented and visualized using nodes to represent individual elements and using arcs to connect the nodes.

FIG. 1 is a diagram showing the configuration of a computer system according to an example embodiment that constitutes a graph data visualization apparatus for graphics display of graph data. In FIG. 1, a computer system 10 comprises a processor (CPU) 11, for performing a graphic display process under the control of a program; a main memory 12, in which the program for controlling the processor 11 is stored; a display device 13, for displaying a graphic image (hereinafter referred to simply as graphics) of graph data generated by the processor 11; and a storage device 14, in which graph data to be processed is stored.

It is noted that only the components for carrying out the present invention are shown in FIG. 1, whereas in actuality, in addition to these components, an input device, such as a keyboard or a mouse, for entering various commands and data, a speech output mechanism and other peripheral devices, and an interface for a network are also provided.

Figure 2:
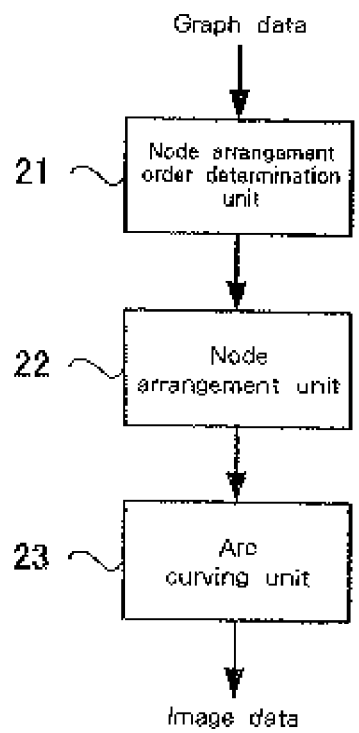
FIG. 2 is a diagram for explaining a configuration of a graphics preparation system that implements the graph data graphics display according to the embodiment.

FIG. 2 is a diagram for explaining the configuration of a graphics preparation system according to the embodiment for graphically displaying graph data. In FIG. 2, the graphics preparation system of this embodiment comprises: a node arrangement order determination unit 21, for employing graph data to determine the order in which to arrange nodes;

a node arrangement unit 22, for determining the locations of nodes in an arrangement; and an arc curving unit 23, for curving predetermined arcs.

The components in FIG. 2 are virtual software blocks implemented by the processor 11 that is controlled by a computer program stored in the main memory 12 in FIG. 1. The computer program for controlling the processor 11 is provided by being stored on a storage medium, such as a CD-ROM or a floppy disk, or by being transmitted via a network. The thus provided computer program is loaded into the main memory 12 and then provides control for the CPU 11, so that the functions of the components in FIG. 2 are executed by the computer system 10 in FIG. 1.

Figure 3:
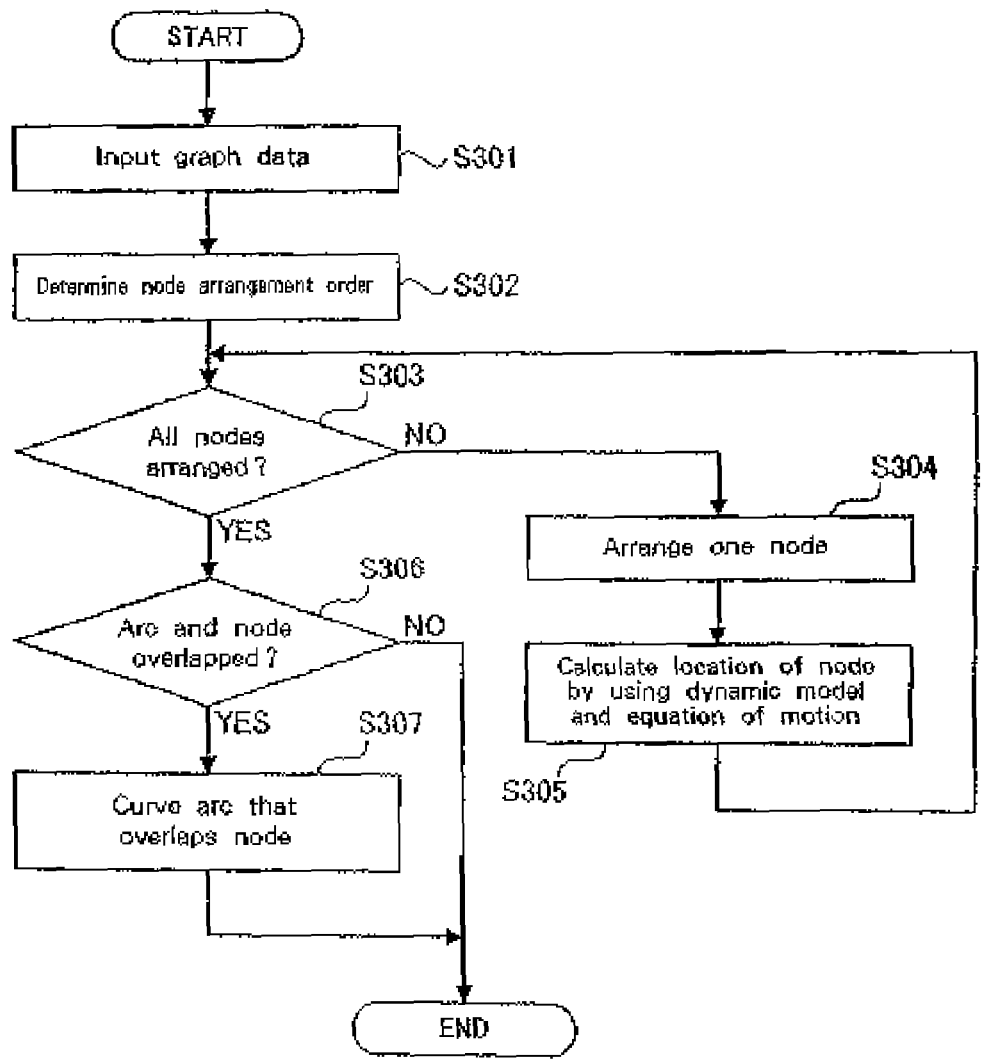
FIG. 3 is a flowchart showing the general graphics preparation processing performed by the graphics preparation system according to the embodiment.

FIG. 3 is a flowchart for the general graphics preparation processing performed by the graphics preparation system in this embodiment. As is shown in FIG. 3, in this embodiment, first, graph data to be processed is entered (step S301), and then the node arrangement order determination unit 21 determines the order in which nodes are to be arranged (step S302). In accordance with the order determined for the addition and arrangement of nodes, the node arrangement unit 22 arranges the nodes individually (steps S303 and S304). Each time a node is to be added, to accommodate the new node, changed locations for nodes that were arranged previously are calculated and are reflected in the graph (step S305). When arrangement of nodes has been completed, the arc curving unit 23 examines the graph to determine whether there are any locations whereat arcs and nodes are overlapped. When no locations are found whereat arcs and nodes are overlapped, the processing is then terminated (step S306). If, however, locations whereat one or more arcs and nodes are overlapped, the pertinent arc or arcs are curved to eliminate the overlapping, and then the processing is terminated (step S307).

The functions and operations of the individual components in FIG. 2 will now be described in detail. The node arrangement order determination unit 21 receives graph data to be processed, and in accordance with the graph data, determines the order in which nodes are to be arranged. Since, as is described above, the graph data is stored in the storage device 14, the processor 11, which serves as the node arrangement order determination unit 21, obtains the graph data by reading it from the storage device 14. The graph data to be processed may be stored on a storage medium, such as a floppy disk or a CD-ROM, loaded in a drive, and the drive used to read the data. Or alternately, the graph data may be received from another computer system via a network.

Figure 4:
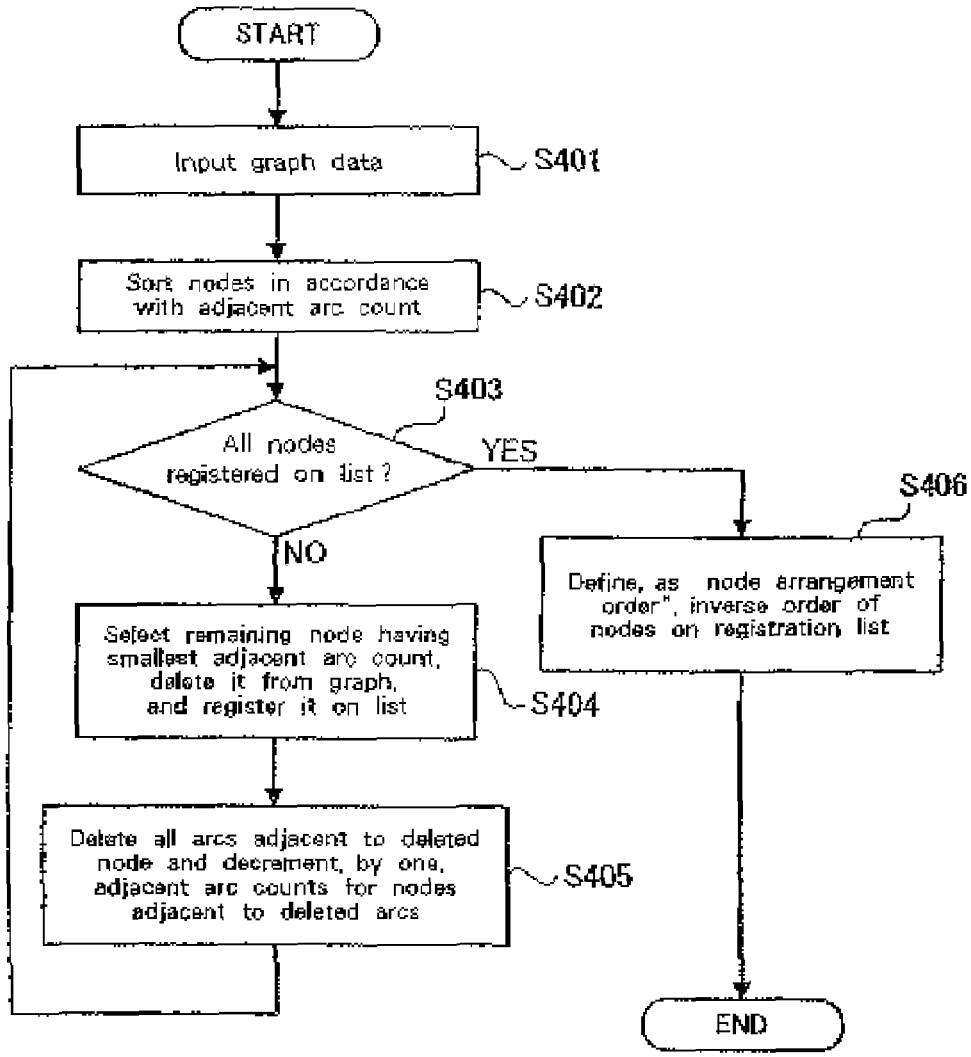
FIG. 4 is a flowchart showing the processing performed by a node arrangement order determination unit for determining the node arrangement order.

FIG. 4 is a flowchart for explaining the processing performed by the node arrangement order determination unit 21 for determining the order in which nodes are to be arranged. As is shown in FIG. 4, first, the node arrangement order determination unit 21 receives graph data (step S401), and then it sorts nodes in accordance with the number of arcs adjacent to the nodes (hereinafter referred to as adjacent arc counts) (step S402).

The node arrangement order determination unit 21 performs the following processes for each node. First, the node having the minimum adjacent arc count is selected and is deleted from the graph data and is registered on a list (steps S403 and S404). Then, all the arcs adjacent to the deleted node are deleted, and the adjacent arc counts for nodes adjacent to these arcs are decremented by one (step S405).

When the processes at steps S404 and S405 have been performed for all the nodes in the graph data, and the nodes have been registered on the list, the node arrangement order determination unit 21 defines, as the node arrangement order, the order (the inverse order in which the nodes were registered) obtained by tracking backward from the last to the first node that was registered on the list (steps S403 to S406).

Figure 5A:
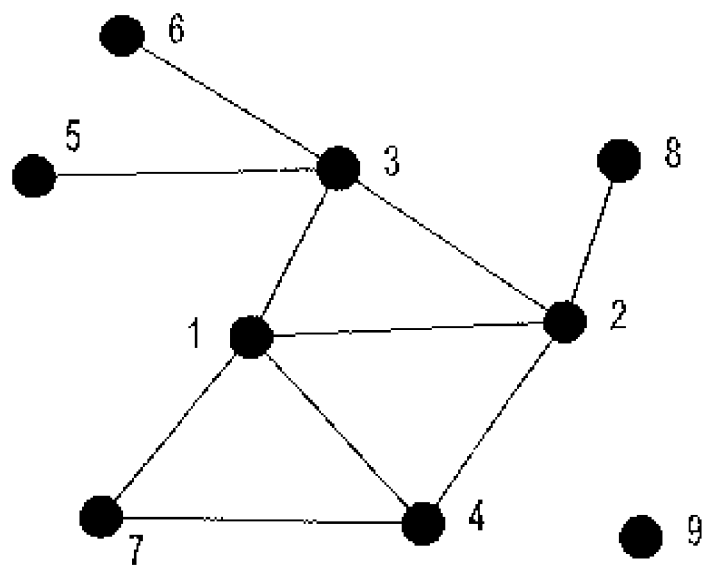
FIGS. 5A and 5B are diagrams for explaining the fact that more satisfactory results are obtained for graph data graphics display when a node having many adjacent arcs is located in the center of the space.
Figure 5B:
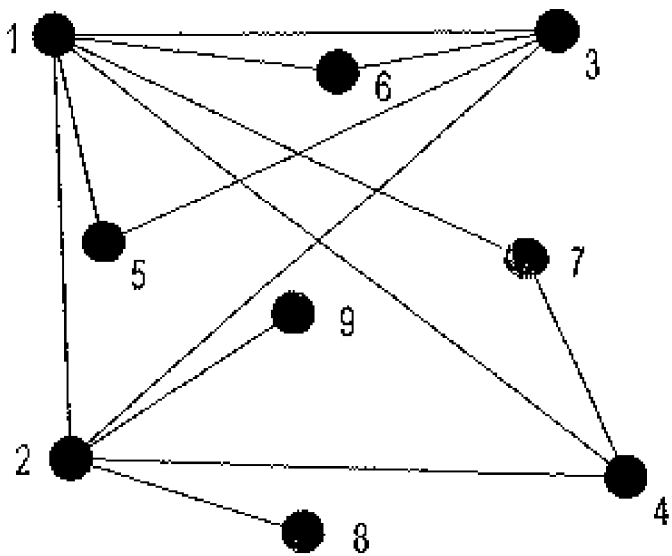

Empirically, it is generally known that preferably the nodes should be so arranged that the primary node, which is connected to many other nodes, is located in the center of the display space. For example, while FIGS. 5A and 5B are equivalent graphs, in the graph in FIG. 5A, wherein the nodes having many adjacent arcs are located in the center of the space and few arc intersections present, the node relationships are more easily and intuitively understood. Therefore, as is described above while referring to FIG. 4, in the embodiment, the order in which nodes are arranged is so determined that a node having many adjacent arcs is positioned first and is located near the center, with succeeding nodes being arranged so they are nearer the periphery.

Figure 6A:
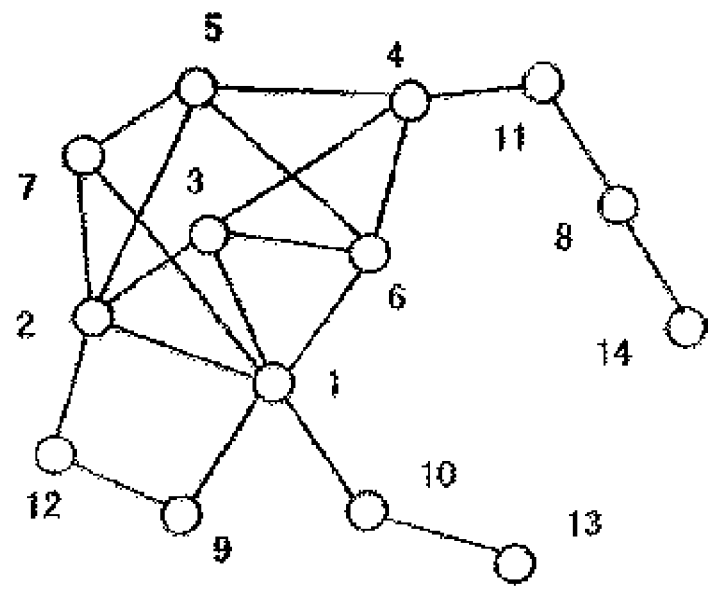
FIGS. 6A and 6B are diagrams for explaining the effects obtained by the process at step 405 in FIG. 4.
Figure 6B:
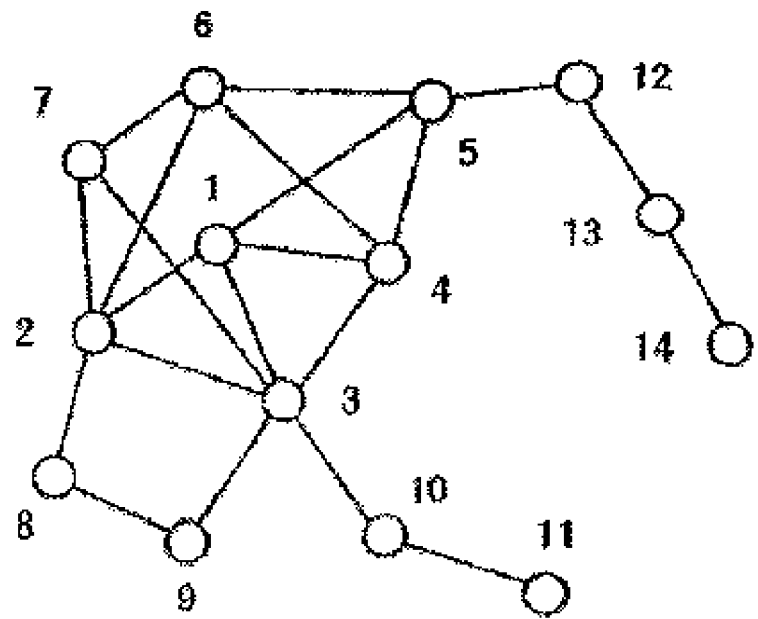

At step 405 in FIG. 4, all the arcs adjacent to the nodes on the list are deleted, and the adjacent arc count for each node adjacent to the arcs is decremented by one. This process is performed in order to cope with a case wherein the determination of the arrangement order should not be based merely on the number of adjacent arcs. FIGS. 6A and 6B are diagrams for explaining the effects obtained through the process at step 405. As is shown in FIG. 6A, when the determination of the arrangement order is based merely on the number of adjacent arcs, the arrangement order for the eighth to twelfth nodes, each of which have two adjacent arcs, is not uniform. Therefore, the adjacent end terminal nodes are not always arranged sequentially. On the contrary, by employing the process at step 405 the arrangement order can be determined so that the end terminal nodes in the graph are arranged sequentially. In the example in FIG. 6B, the nodes from the tenth to the fourteenth are arranged in a row. As a result, a satisfactory arrangement can be easily obtained wherein the end terminal nodes are arranged in a row.

Figure 7A:
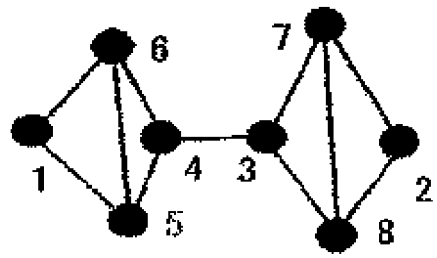
FIGS. 7A to 7D are diagrams for explaining a method for avoiding unnecessary graph separation in the graph data graphics display process.
Figure 7B:
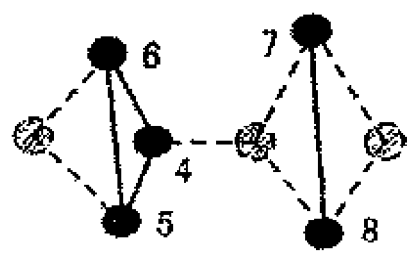
Figure 7C:
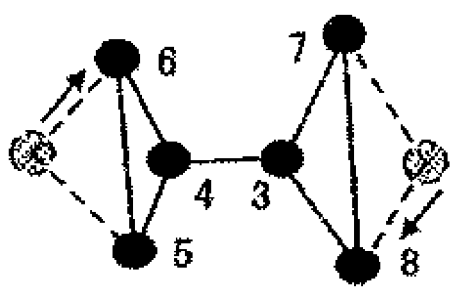
Figure 7D:
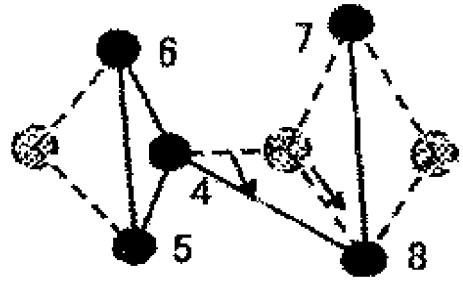

In the node deletion process in FIG. 4, since not only the nodes but also the arcs are deleted, a graph that originally is coupled together so as to form a single line can be separated into multiple discontinuous graph segments. For example, when the nodes in the graph in FIG. 7A are deleted in the order of the numerals allocated for the nodes, the graph is separated into the discontinuous graph segments shown in FIG. 7B. In order to preclude the occurrence of this phenomenon, a principle need only be applied according to which instead of deleting a node, the node and an adjacent node are merged, and an adjacent arc before the node is merged is reattached to the node after the node is merged. FIGS. 7C and 7D are diagrams showing examples wherein nodes have been merged. In these examples, the node adjacent to the arc that is connected to a node other than that constituting the merging destination is separated from the node to be merged, and is re-connected to the node at the merging destination, so that the separation of the graph can be avoided. For example, in FIG. 7D, the arc that connects the third and the fourth node is separated from the third node and is reconnected to the eighth node, so that the graph is not separated. During the merging process, the history of the re-connection of the arc is stored, and when the history of the merging process is reproduced in reverse during the node arrangement process, the graph can be processed without being separated.

In accordance with the node arrangement order determined by the node arrangement order determination unit 21, the node arrangement unit 22 sequentially arranges the nodes, forms necessary arcs and prepares the graphics for the graph data. In this embodiment, the nodes are arranged one by one, so that the positional relationship of each node relative to other nodes that were previously arranged can be adjusted. Therefore, when a new node is added and arranged, based on the dynamic model, calculations are performed for the displacement of previously arranged nodes, an effect necessitated by the addition of the new node, and are reflected in the graphics.

In this embodiment, calculations using the dynamic models, such as the conventionally used intermolecular force model and the spring model, are performed locally in order to calculate the locations of the nodes. This method will now be described in detail. First, the node arrangement unit 22 designates, as N0, a node that is to be added to an arrangement in a display space. The initial location for N0 is defined as one near a node Na, which was previously positioned in the display space and is connected to the node N0 by an arc, but farther from the center of the display space.

Figure 8:
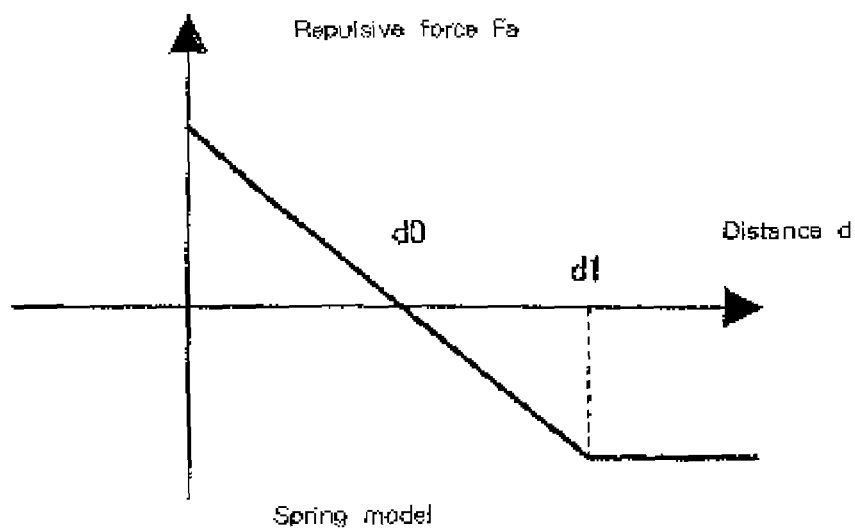
FIG. 8 is a graph showing the function of a spring model used for this embodiment.

The node arrangement unit 22 then employs the spring model for the node Na to exert an attractive force or a repulsive force to adjust the positions of the nodes N0 and Na. At this time, the force Fa, which acts on the node N0 and Na, is calculated using equation 1. FIG. 8 is a diagram showing the function in equation 1.

$$F_a = \begin{cases} -k(d - d_0) \dots d < d_1 \\ -k(d_1 - d_0) \dots d \geq d_1 \end{cases}$$ [Equation 1]

Figure 9:
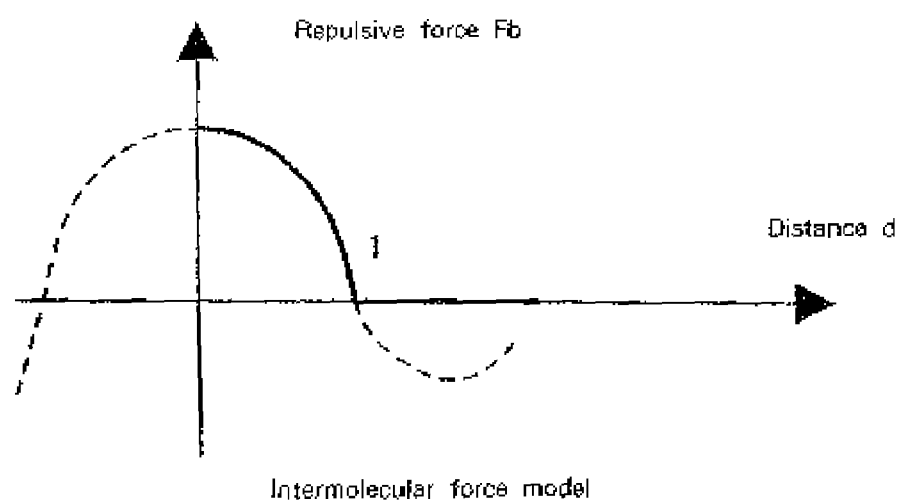
FIG. 9 is a graph showing the function of an intermolecular force model used for this embodiment.

In equation 1, d denotes the ratio of the distance between the center points of the nodes to be processed to the sum of their sizes. k, $d_0$ and $d_1$ denote constants and $d_0 < d_1$ is established. While equation 1 is similar to the calculation employed for the force exerted by a spring that is required to obtain a stable length, it differs in that the magnitude of the force remains constant for a predetermined or greater distance ($d \geq d_1$). This force is exerted to maintain the length of the arc so it close to the stable distance, and to avoid the generation of an unnecessarily long arc. At the same time, the node arrangement unit 22 employs the intermolecular force model for a node Nb that previously was arranged in the display space and that is not connected to the node N0 by an arc, and the repulsive force acts on the nodes N0 and Nb. At this time, a force Fb, which acts on the nodes N0 and Nb, is calculated using equation 2. FIG. 9 is a diagram showing the function of equation 2.

$$F_b = \begin{cases} k\left(\frac{5}{4}d^3 - \frac{19}{8}d^2 + \frac{9}{8}\right) \dots d < 1 \\ 0 \dots d \geq 1 \end{cases}$$ [Equation 2]

In equation 2, k denotes a constant. While equation 2 is similar to a typical equation, for the intermolecular force model, for which the van der Waals force is approximated by using a cubic function, equation 2 differs in that the magnitude of the force is zero when $d \geq 1$ is established. This force is exerted to maintain, at the least, a constant distance between nodes that are not coupled by an arc and to avoid the overlapping of nodes. The approximate strength of the van der Waals force using the cubic function is, for example, the equivalent of the intermolecular force used by the bubble mesh method described in the following reference document 1. Reference document 1: "Automatic mesh division using a physical model" by Shimada, Simulation, Vol. 12, No. 1, pp. 11-20, 1993.

When these two forces are calculated for the nodes, the node arrangement unit 22 obtains a node displacement using the equation of motion. In this case, a stable location for each node can be calculated by repetitively obtaining node displacements using a differential equation solution, such as the Runge-Kutta method. In this case, when a node is added in an area, a node that is displaced by the direct inter-node force acting on the added node is either 1. a node connected by an arc to the added node, or
2. a node that is located close enough to the added node, even though it is not connected by an arc to the added node.

The addition of a node to an arrangement displaces peripheral nodes; however, this effect is reduced proportionately as the distance from the added node increases. Therefore, when a predetermined displacement or less is ignored, the range within which a node that it is determined will currently be displaced can be limited. Since this range does not depend on the size of the entire graph, the scope of the calculations required to add one node is O(1), and the scope of the calculations required to arrange all the nodes is 0(N). Since the calculation time for the dynamic models in the conventional graphics display technique is, in the worst case, about $O(N^2)$, the processing speed can be dramatically increased by locally employing the dynamic model in this embodiment.

Figure 10:
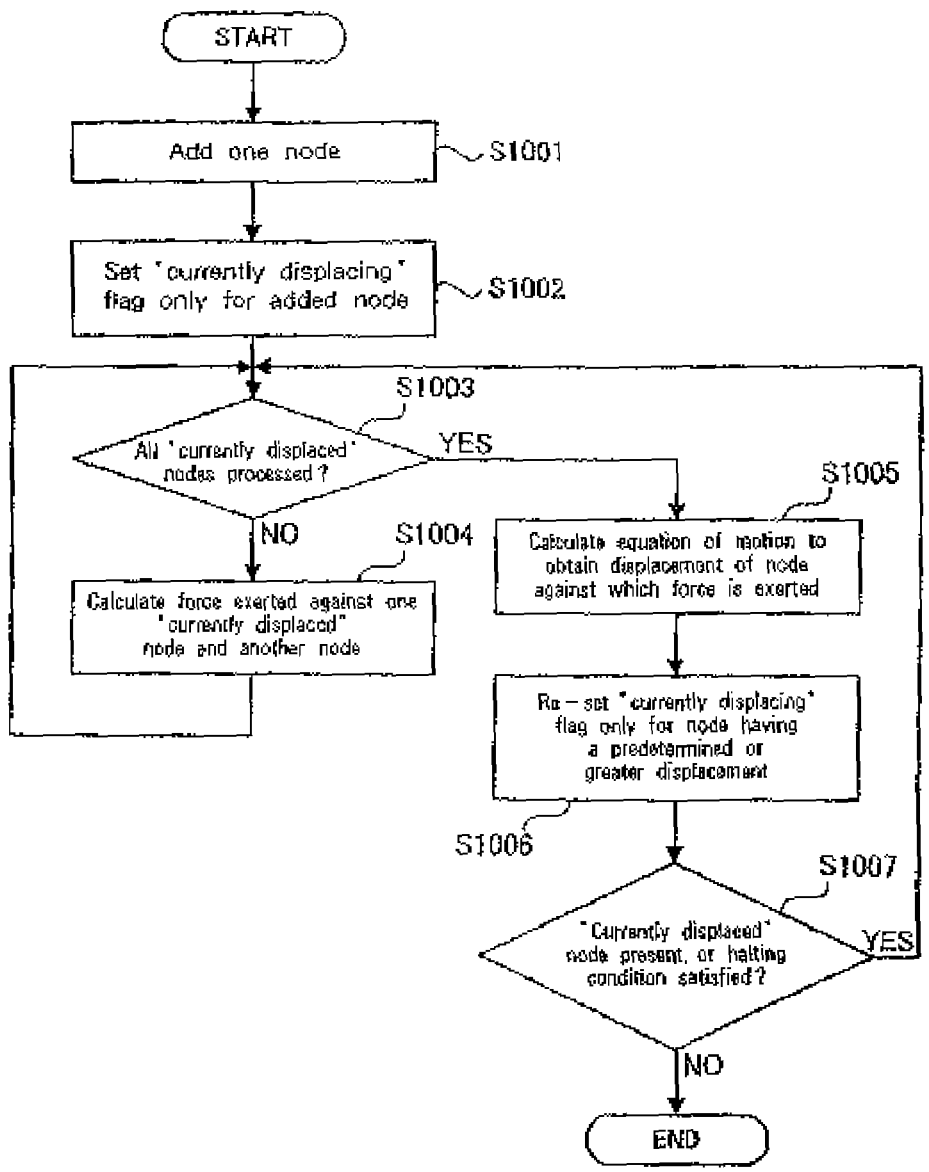
FIG. 10 is a flowchart for explaining the processing performed by the node arrangement unit according to the embodiment.

FIG. 10 is a flowchart for explaining the processing whereby when a node is added, the node arrangement unit 22 calculates the location of a node that is displaced by the inter-node force produced by the added node.

As is shown in FIG. 10, when a new node N0 is arranged in the display space (step S1001), the node arrangement unit 22 sets a "currently displacing" flag for the node N0 that is added (step S1002).

The node arrangement unit 22 calculates the force using the spring model for m nodes that are already arranged in the display space and that are connected to the node N0 by arcs. Further, the node arrangement unit 22 calculates the force using the intermolecular force model for only k nodes that are already arranged in the display space and that are not connected to the node N0 by arcs and that are located within a predetermined distance of the node N0 (steps S1003 and S1004).

When the force using the spring model and the force using the intermolecular fore model have been obtained for all the nodes to be processed (m nodes and k nodes), the node arrangement unit 22 employs the equation of motion to calculate the displacement only for the node N0 and (k+m) nodes (step S1005). In addition, the "currently displacing" flag is set for a node that is displaced further than a specific distance (step S1006).

When there is a node for which the "currently displacing" flag is set at step S1006, the node arrangement unit 22 obtains the inter-node force between the node for which the "currently displacing" flag is set and the node connected by the arc and for a node that is located close enough, and obtains the displacement for the node for which the flag was set (steps S1007, and S1003 to S1005).

This processing is repeated until there are no more nodes for which the "currently displacing" flag was set at step S1006. Instead of repeating the processes at steps S1003 to S1006 until there are no more nodes for which the "currently displacing" flag is set, the processes may be halted after being repeated a constant number of times, and the processing terminated.

FIGS. 11A to 11F are diagrams for explaining the arrangement of nodes performed by the node arrangement unit 22, and the displacement of nodes based on this arrangement. In FIG. 11A, several nodes have already been arranged. In FIG. 11B, one node N0 is added to the graphics in FIG. 11A, and a "currently displacing" flag is set for the node N0 (see steps

1001 and 1002 in FIG. 10). At this time, the force exerted between the node N0 and the node to which it is connected by an arc, and a node that is not connected to the N0 by an arc but that is located close enough is obtained (see steps 1003 and 1004 in FIG. 10).

Following this, based on the obtained force, the displacement of each node is calculated and is reflected in the graphics (see step 1005 in FIG. 10), and the "currently displacing" flag is again set for a node that is greatly displaced. In FIG. 11C, the node is displaced from the state in FIG. 11B by the addition of the node N0. The shaded nodes in FIG. 11C are those that are greatly displaced and for which the "currently displacing" flag is set. Thereafter the above process is repeated, i.e., the force is calculated in the same manner for these nodes for which the "currently displacing" flag is set, the nodes are displaced in accordance with the force, and the "currently displacing" flag is set for nodes that are greatly displaced.

In FIG. 11D, the force between each node in FIG. 11C for which the "currently displacing" flag is set, and a node connected by the arc or an adjacent node is calculated. Further, in FIG. 11E, the force obtained in FIG. 11D is employed to calculate the displacement for each node, and the displacement is reflected to the graphics. The shaded nodes in FIG. 11E are those that are greatly displaced, and for which the "currently displacing" flag is set. In FIG. 11F, the force between the node in FIG. 11E for which the "currently displacing" flag is set and the node connected by an arc or an adjacent node is calculated.

The arc curving unit 23 examines the graphics generated by the node arrangement unit 22 to determine whether there is an overlap between an arc and a node. An arc that overlaps a node is curved to detour around the node, so that the overlapping is removed. This processing will be described in detail.

Figure 12:
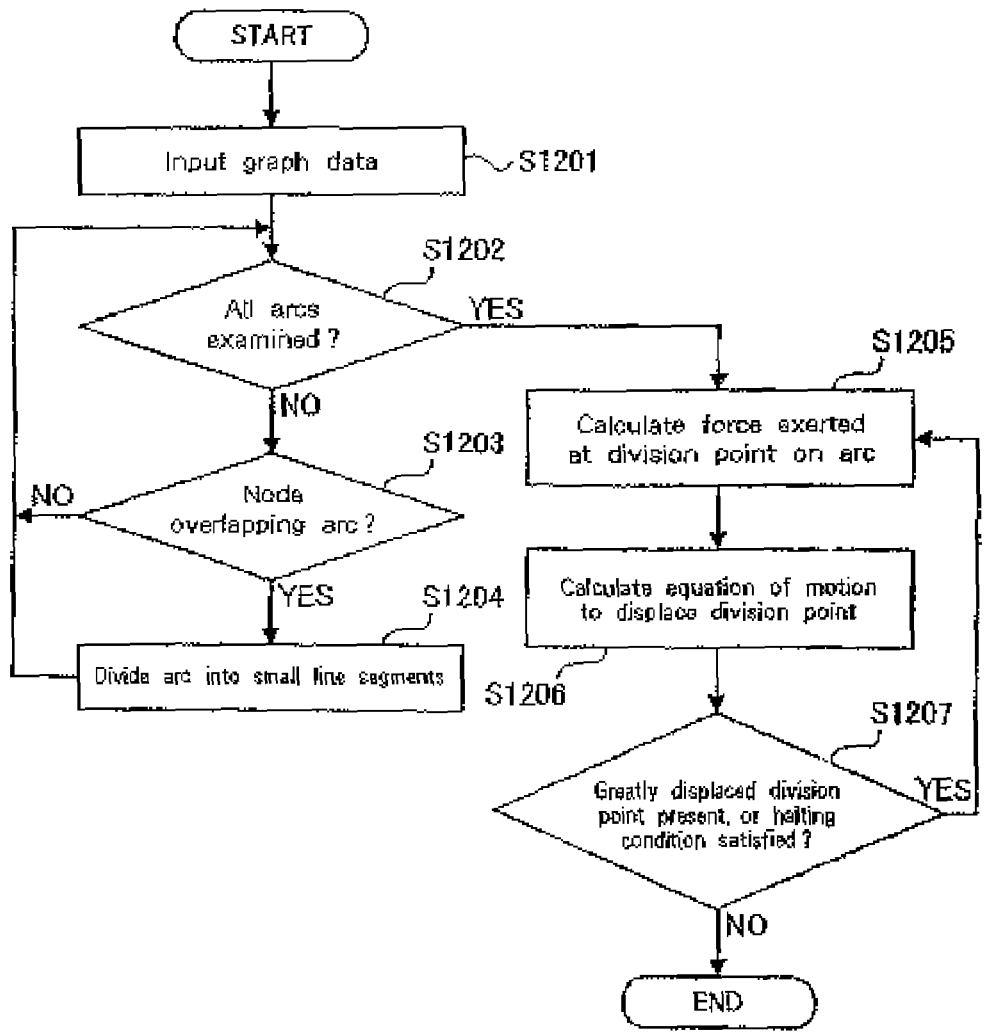
FIG. 12 is a flowchart for explaining the arc curving process performed by the arc curving unit according to the embodiment.

FIG. 12 is a flowchart for explaining the processing performed by the arc curving unit 23 to curve an arc. As is shown in FIG. 12, when the arc curving unit 23 receives graph data wherein nodes are arranged by the node arrangement unit 22 (step S1201), the arc curving unit 23 determines whether an arc constituting the graph overlaps a node (steps S1202 and S1203). If there is an arc that overlaps a node, the arc is divided into small line segments (step S1204).

Figures 13A, 13B:
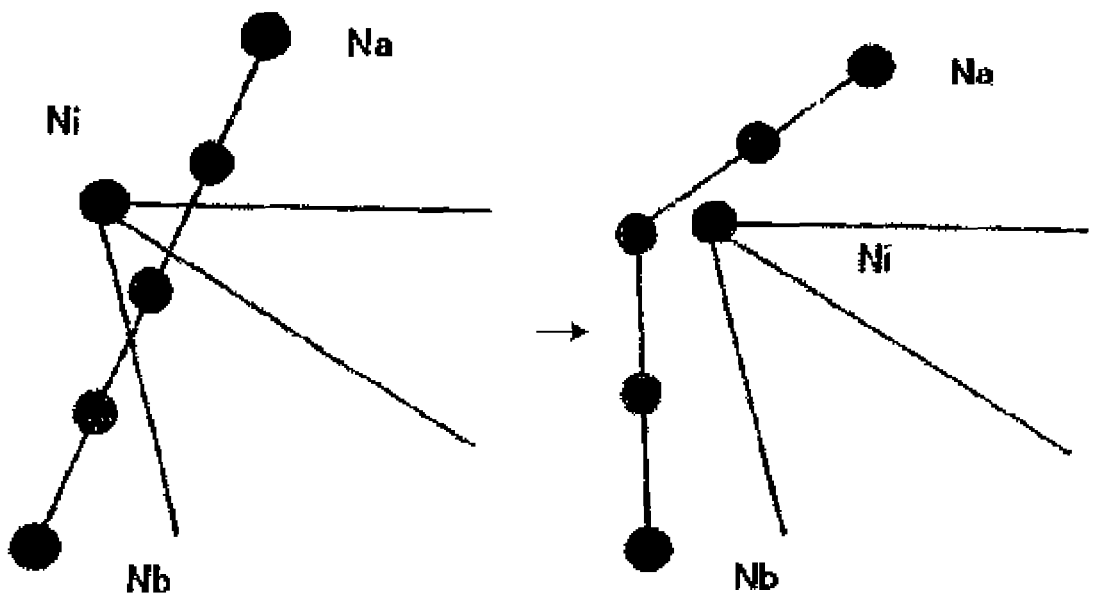
FIGS. 13A and 13B are diagrams for explaining the process for calculating the locations of the division points on an arc according to the embodiment.

FIG. 13 is a diagram for explaining the processing for calculating the locations of division points on an arc. The arc curving unit 23 examines a linear arc NaNb that connects two nodes Na and Nb to determine whether there is a node present that is extremely close to the linear arc NaNb or within a predetermined distance. If there is at least one node Ni that is located so closely, the linear arc NaNb is divided into (N+1) segments (see FIG. 13A).

Next, the number of intersections of the linear acc NaNb and the arc connected to the node Ni is determined. If the number of intersections of the arcs is to be reduced by the linear arc NaNb being curved so that it circles around the node Ni, the initial locations of the division points are obtained to circle around the node Ni (see FIG. 13B). When all the arcs have been examined and the arc that overlaps the node has been divided into small segments, the arc curving unit 23 employs the dynamic model for the division points of the arc to calculate the force (step S1205).

In this embodiment, the following four forces are exerted at n division points on the arc.

(A) An intermolecular force model to maintain, at the least, a constant distance between a division point on an arc and an adjacent node.

(B) A spring model to maintain, at the least, a constant distance between a line segment of an arc and an adjacent parallel arc.

(C) A spring model to maintain a constant length for each line segment of an arc.

(D) A spring model to maintain a constant curvature for a line segment of an arc.

FIGS. 14A-14D are a conceptual diagram showing the actions of these forces. Relative to the force 14(A), the function of the distance between the division point and the adjacent node is employed to calculate the attractive force or the repulsive force. Relative to the force 14(B), the function of the distance between a division point and an adjacent arc is employed to calculate the attractive force and the repulsive force. Relative to the force 14(C), the function of the distance between a division point and an adjacent division point is employed to calculate the attractive force or the repulsive force. And relative to the force 14(D), the spring model disclosed in the following reference document 2, for example, is employed to calculate the attractive force or the repulsive force.

Reference document 2: "Method for generating a smooth curve and a smooth curved face using a discrete spring model", by Atsushi Yamada, Kenji Shimada, Tomotake Furuhata and Ko-Hsiu Hou, IPSJ Graphics and CAD/Visual Computing Symposium '99, pp. 43-48, 1999.

By applying the "force to maintain a constant curvature" (D), the arc draws a smooth curved line. Therefore, when the arc is divided into line segments, an erroneous reading that a portion that "looks like it is folded" is regarded as a node can be prevented. In this manner, at step S1205, the force exerted at the division point Pi (i=1 . . . , n) of each arc segment obtained at step S1204 is calculated, and the displacement of the division point Pi is obtained by using the equation of motion (step S1206). In this case, a stable location for a division point can be obtained by repetitively calculating the displacement of the division point using a differential equation solution, such as the Runge-Kutta method. This is repeated, step S1207, until a greatly displaced division point is present or a halting condition is satisfied.

FIGS. 15A to 19B are diagrams showing graphics display examples when the embodiment of the invention is actually applied for various graph data. In FIGS. 15A to 15I, the graphics display process for graphic data is shown where nodes are added one by one, and the final ten nodes are arranged. FIG. 15B shows 3 nodes. FIG. 15C shows 4 nodes. FIG. 15D shows 5 nodes. FIG. 15E shows 6 nodes. FIG. 15F shows 7 nodes. FIG. 15G shows 8 nodes. FIG. 15H shows 9 nodes. FIG. 15I shows 10 nodes. As is shown in FIG. 15, in this embodiment, each time a node is added, a force is exerted between the pertinent node and nodes that were arranged previously, and their positions are corrected. Therefore, as is shown in FIG. 15I, a well-balanced graphics display, wherein the positional relationships of the nodes can be easily understood, can finally be provided.

In FIGS. 16A to 16F, the graphics display process for graph data having 70 nodes is shown. Since in this example also the positions of all the nodes are corrected each time a new node is added, as is shown in FIG. 16F, a well-balanced graphics display, wherein the positional relationships of the nodes can be easily understood, can be provided.

Figure 17A:
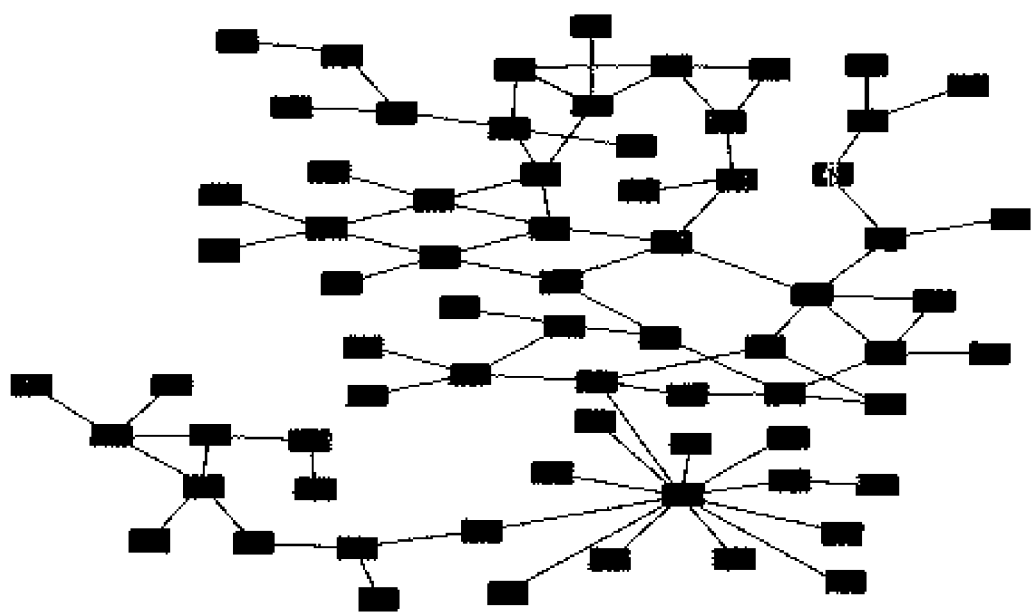
FIGS. 17A and 17B are diagrams showing graphics display examples wherein the embodiment is actually employed for various graph data, and showing a comparison between the arrangement obtained using the conventional method and the arrangement obtained using the embodiment.
Figure 17B:
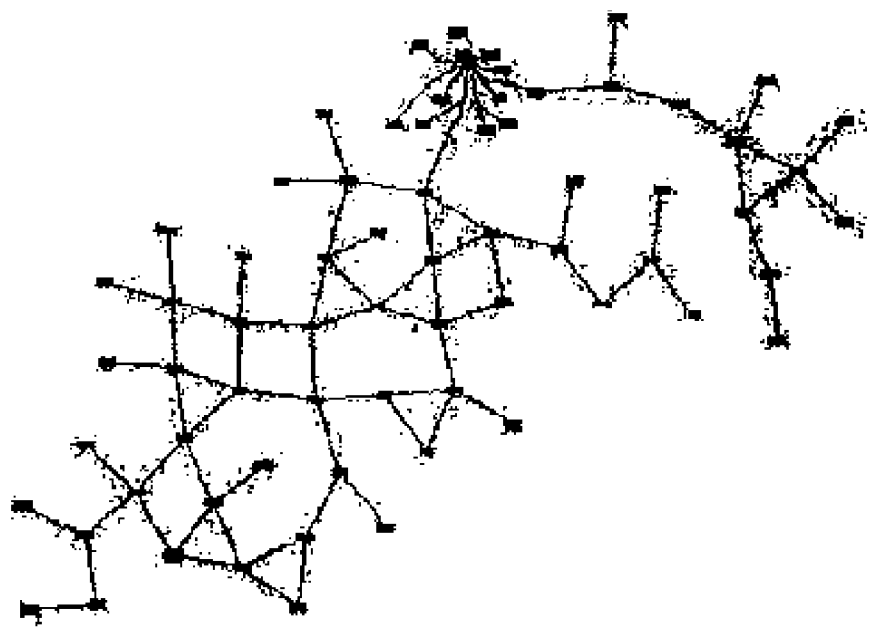

The arrangement of the graph data in FIG. 16 is shown in FIG. 17A using the conventional method. The arrangement of the graph data using the method of the embodiment shown in FIG. 17B. The conventional method is a method whereby, while using dynamic models (the spring model and the intermolecular force model), all the nodes are arranged from the beginning and the equation of motion is repetitively solved. When the arrangement provided by the conventional method in FIG. 17A is compared with the arrangement provided by the method of the embodiment in FIG. 17B, both arrangements are satisfactory where there are few node overlappings and few arc intersections. However, the calculation time required for the conventional method was 73 seconds, while the calculation time required for the embodiment was only 19 seconds. Therefore, it was found that the processing speed attained by this embodiment is much higher.

Figure 18A:
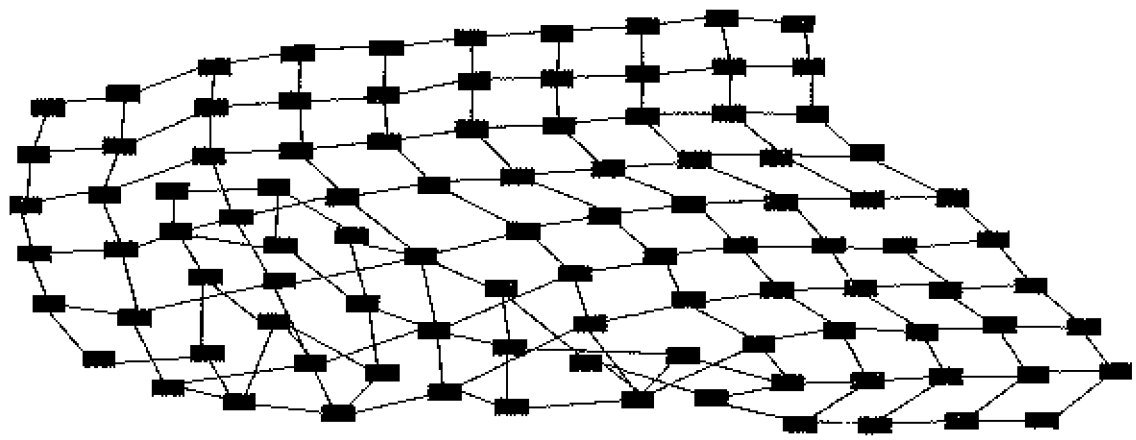
FIGS. 18A and 18B are diagrams showing graphics display examples wherein the embodiment is actually employed for various graph data, and showing a comparison between the arrangement obtained using the conventional method and another arrangement obtained using the embodiment.
Figure 18B:
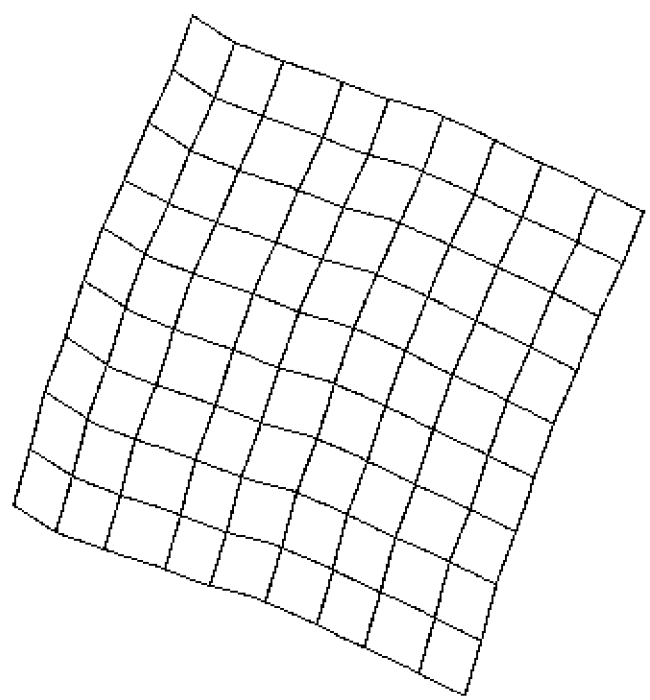

In FIGS. 18A and 18B, for graph data having 100 nodes and a grid shaped topology, the arrangement provided by using the conventional method is compared with the arrangement provided by using the method of the embodiment. While referring to FIG. 18A and the arrangement provided by the conventional method, since the initial positions of nodes could not be appropriately designated, in the obtained arrangement the grid shaped topology could not easily be understood visually. Whereas, while referring to FIG. 18B and the arrangement provided by the embodiment, in the obtained arrangement the grid shaped topology can easily be understood visually. The calculation time required for the conventional method was 149 seconds, while the calculation time required for the embodiment was only 31 seconds. Therefore, in this example also, it is found that the processing speed for the method of this embodiment is much higher.

Figure 19A:
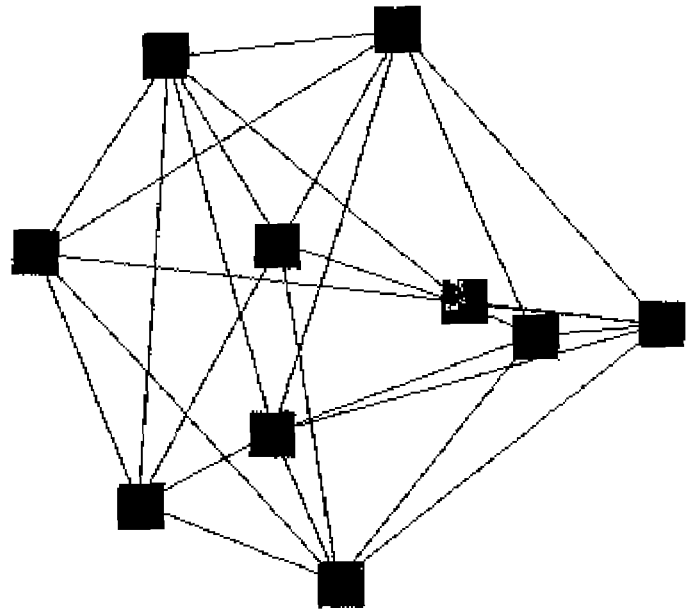
FIGS. 19A and 19B are diagrams showing graphics display examples wherein the embodiment is actually employed for various graph data, and showing the state wherein by curving arcs the structure of the graph data can more easily be understood.
Figure 19B:
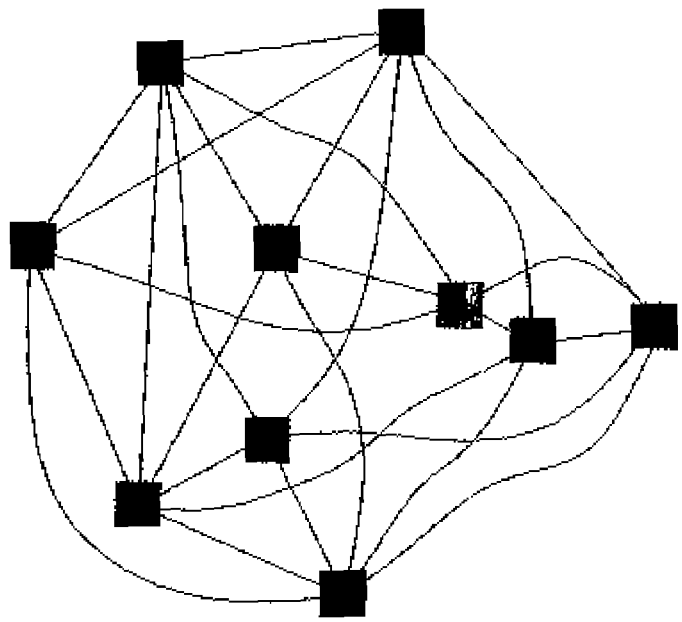

In FIGS. 19A and 19B, the arcs are curved so that the structure of the graph data can more easily be understood. While referring to FIG. 19A, wherein all the arcs are linearly drawn, the arcs are overlapped or intersect near a couple of nodes on the right, and the relationship of the nodes can not easily be understood. On the contrary, while referring to FIG. 19B, wherein the arcs passing near nodes are curved and detour around the nodes, the distances between the arcs and the nodes are appropriately maintained, and the overlapping of arcs and nodes is avoided. Further, as is shown in the lower left portion in FIG. 19B, the arc intersections are reduced by curving the arcs. Because of these effects, the relationships of the nodes can easily be understood, and erroneous readings of the graph data can be prevented.

Figure 20:
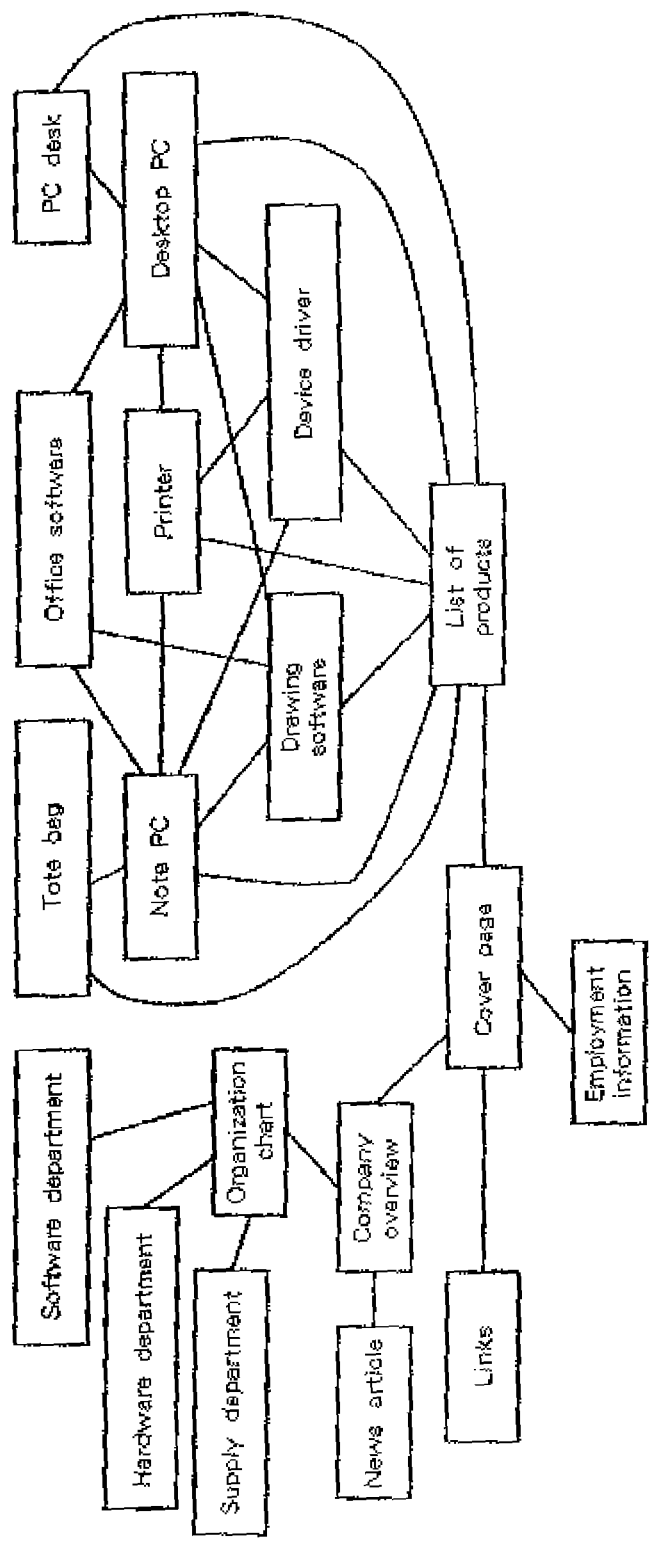
FIG. 20 is a diagram showing an example wherein the embodiment is used for a graphics display for specific graph data.
Figure 22:
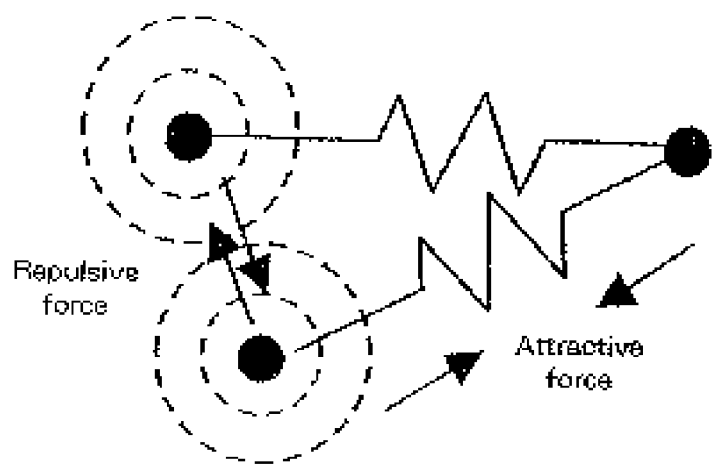
FIG. 22 is a diagram showing the state wherein an intermolecular force model is employed for nodes in a graph and a spring model is employed for arcs.

FIG. 20 is a diagram showing an example wherein this embodiment is applied for a graphics display for specific graph data. In this example in FIG. 20, the structure of linked web pages is visualized. Specifically, in a company introduction web site consisting of the pages "cover page", "overview of the company", "employment information" and "list of products", and of lower ranked pages, a graph for the linked structure of the web pages is visualized by using the individual web pages as nodes and the individual links as arcs.

The graph data graphics display technique for this embodiment is appropriate not only for the linked structure for the web pages shown in FIG. 20, but also for the following fields for visualizing their organization.

1. The network of a computer system is formed into a graph to be used for the management of traffic and for the detection of failures.
2. A network, such as a financial, transportation or communication network, is formed into a graph to be used to understand transaction volumes or for predicting the future.
3. The network of a hierarchical organization, such as a self-governing community or a company personnel administration division, is formed into a graph to optimize the utilization of personnel resources.
4. For a set of text data and a set of image data, a graph is formed by linking the individual data, which are regarded as nodes, in accordance with their correlations, and the overall structure and trend of the data can be understood.
5. While sequence patterns in genetic data are used as nodes, the nodes are linked in accordance with their correlations to form a graph, and characteristics and rules can be found.
6. While functions and classes are used as nodes in a software programming environment, they are linked together in accordance with calling relationships, and a sub-graph formed for each project makes it possible to understand the software development status.

Thus as is described above, according to the invention, the processing speed for the graphics display for graph data is increased, and the requests both for high quality node arrangements and for fast processing are appropriately satisfied. In addition, according to the present invention, a graph data graphics display technique can be provided whereby superior node arrangements can be obtained.

The present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer implemented graph data visualization apparatus comprising:

a processor, for employing graph data to generate a graphics image that includes nodes and arcs that connect said nodes; and a display unit, for displaying said graphics image generated by said processor on a display, wherein said processor sequentially adds and arranges nodes in a display space provided by said display unit, said processor forming an arrangement of nodes in said display space, and wherein, each time a node is added to the arrangement of nodes, said processor corrects the positioning of the individual nodes in the arrangement, by using a predetermined dynamic model employed only for a local area wherein said added node is located, and for correcting the positions of individual nodes in the local area previously arranged in said display space, wherein all said nodes and said arcs in said graphics image becoming arranged in the display space on the display provided by said display unit displaying the image resulting from all processing.

2. The graph data visualization apparatus according to claim 1, wherein said processor performs another position correction process to correct the positions of individual nodes by using said model for a node that is added to said display for nodes that are adjacent to said added node, and for other nodes that are located within a predetermined distance of said added node, without affecting the display in entirety.

3. A physical computer program product comprising a computer readable medium having computer readable program code means embodied therein for causing data visualization on a display, the computer readable program code means in said computer program product for causing a computer to effect the functions of claim 1.

* * * * *